July 31, 1934.  W. W. SLAGHT ET AL  1,968,787
UNIVERSAL JOINT
Filed June 25, 1931    3 Sheets-Sheet 1

INVENTORS
Herman F. Braun
William W. Slaght
BY Evans & McCoy
ATTORNEYS

July 31, 1934. W. W. SLAGHT ET AL 1,968,787
UNIVERSAL JOINT
Filed June 25, 1931  3 Sheets-Sheet 2

INVENTORS
Herman F. Braun
William W. Slaght
BY Evans & McCay
ATTORNEYS

July 31, 1934.   W. W. SLAGHT ET AL   1,968,787
UNIVERSAL JOINT
Filed June 25, 1931   3 Sheets-Sheet 3

INVENTORS
Herman F. Braun
William W. Slaght
BY
ATTORNEYS

Patented July 31, 1934

1,968,787

UNITED STATES PATENT OFFICE 1,968,787

UNIVERSAL JOINT

William W. Slaght and Herman F. Braun, Lakewood, Ohio, assignors to Cleveland Steel Products Corporation, Cleveland, Ohio, a corporation of Ohio Application June 25, 1931, Serial No. 546,702

6 Claims. (Cl. 64—102)

This invention relates to universal joints and one of the objects of the present invention is to provide a universal joint of new and improved construction that can be economically manufactured and easily and quickly assembled.

Another object is to provide a universal joint of the cross type with new and improved means for mounting the cross within the yoke members of the joint.

Another object is to provide a universal joint with means for preventing spreading of the cross carrying yokes under severe operating conditions.

Another object is to provide a universal joint of the cross type with cap members on the yokes for absorbing end thrust of the cross.

Another object is to provide a universal joint of the cross type with improved means for lubricating the cross bearings.

Another object is to provide a universal joint of the cross type with means for preventing leakage of lubricant from the joint when the same is not in operation, and for permitting flow of lubricant to the cross bearings when the joint is in operation.

Another object is to provide a universal joint with means for preventing leakage of lubricant between the cross and yoke bearings when the joint is being filled with lubricant under pressure.

A further object is to provide a universal joint with means providing a re-circulation of lubricant to the bearing surfaces after it has once passed therebetween.

A still further object is to provide a universal joint of the cross type with a lubrication chamber in the cross which is closed when the cross is not in operation, and which opens upon operation of the joint.

With the above and other objects in view which will be apparent from the following description, the present invention may be said to consist in certain features of construction and combinations of parts that will be readily apparent to those skilled in the art to which the invention appertains.

In the drawings which illustrate a suitable embodiment of the present invention, Figure 1 is a plan view of a type of universal joint of the present invention which is adapted for use in motor vehicles;

Figure 1:
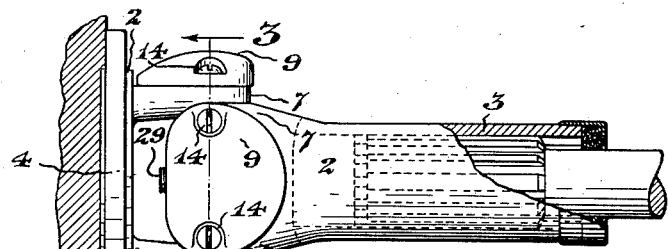

It is the purpose of the present invention to provide an efficient universal joint of the cross type that is so arranged as to overcome the disadvantages inherent in the heretofore known joints of this type.

Provision is made in the joint of the present invention for an easy assembly of the parts, and for efficient lubrication of the working surfaces.

In many types of joint heretofore known, the arm bifurcations of each yoke had a tendency to spread when operated under severe conditions because of the fact that the bearing pin of the cross was received between bifurcations formed in the end of the arm. The joint about to be described is arranged to prevent spreading of the yoke bifurcations and to maintain the yoke and cross in their correct operating relationship without adding to the cost of production of the joint.

Referring to the accompanying drawings in which like numerals refer to like parts throughout the several views, the universal joint about to be described in detail includes a cross 1 and a pair of opposed yokes 2 connected thereto. The yokes shown are the type commonly used for motor vehicle running gear, the one yoke having a tubular portion 3 for sliding reception of a propeller shaft and the other having a flange 4 for attachment to an axially fixed rotary member. It is to be understood, however, that the yokes 2 may be of any desired construction according to their particular use.

The cross 1 is provided with the usual bearing pins 5 arranged at 90 degree intervals about a common plane at the periphery of the body portion thereof, and are of a diameter sufficiently less than the width of the body portion as to provide radial shoulders 6, the purpose of which will be later described.

Each yoke 2 is provided with a pair of spaced axial arms 7, each of which having connection with a cross bearing pin 5 when the joint is assembled. The yokes when attached to the cross are disposed at right angles to each other in overlapping relation and the yokes are sufficiently spaced apart to permit free rotation of the joint, although the axis of one yoke may be disposed at an angle to the axis of the other yoke.

Figure 6:
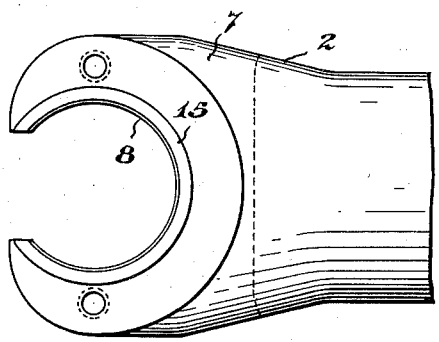
Fig. 6 is a plan view of the yoke shown in Fig. 5 illustrating the circular flange formed on the outer surface thereof.
Figure 8:
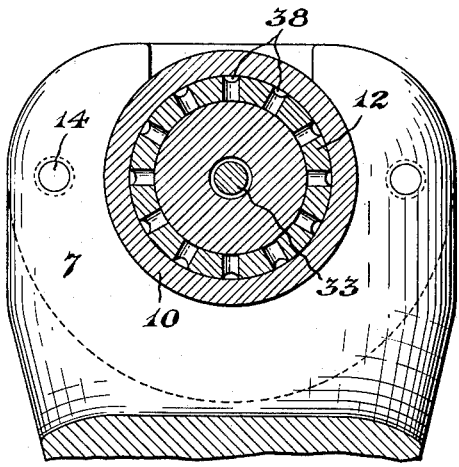
Fig. 8 is a section taken substantially on the line 8—8 of Fig. 7.

Each arm 7 of each yoke 2, as shown in Figs. 1 and 6, is bifurcated and is formed with an opening 8 between the bifurcations that preferably is of circular shape. The distance between the bifurcations at the end of the arm may be slightly greater than the diameter of the bearing pin 5 of the cross to permit quick assembly, but the diameter of the opening 8 defined by the bifurcations is materially greater than the diameter of the bearing pins 5.

Figure 2:
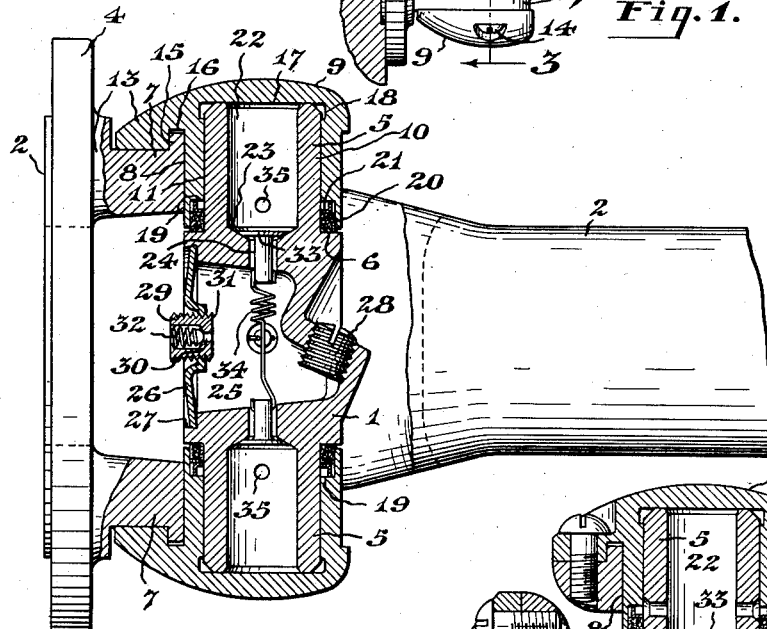
Fig. 2 is a longitudinal section taken through the joint shown in Fig. 1.
Figure 7:
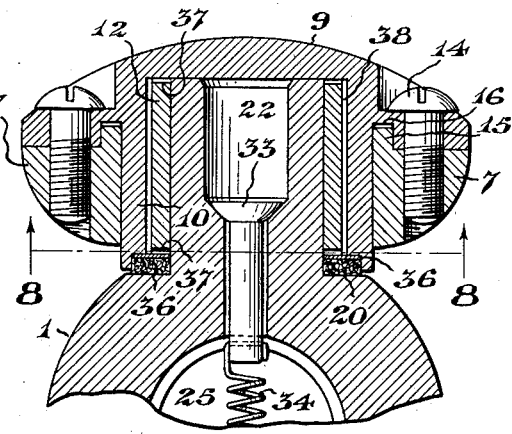
Fig. 7 is a section somewhat similar to Fig. 4 but showing the use of a separate bushing for the cross bearing.

The bearing pins 5 of the cross are mounted in the arms 7 of the yoke 2 by means of caps 9 secured to the yoke arms 7, each of which is provided with a hollow cylindrical sleeve 10 that fits within the arm opening 8 and an internal bearing surface 11 for the contained cross bearing pin 5. This bearing surface 11 may be formed on the sleeve pin proper, as shown in Fig. 2, or it may be formed on a separate bushing 12 that is pressed into the sleeve, as shown in Fig. 7.

Figure 4:
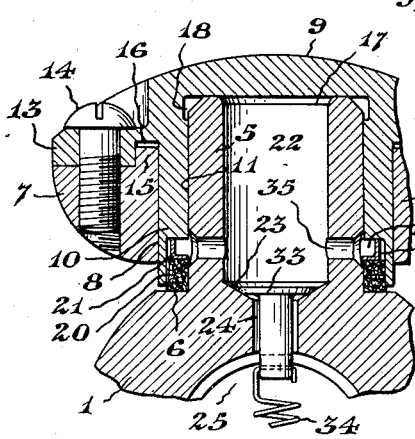
Fig. 4 is an enlarged fragmentary section similar to Fig. 2 more clearly showing the method of mounting each bearing pin of the universal joint cross in the adjacent arm of the universal joint yoke.
Figure 5:
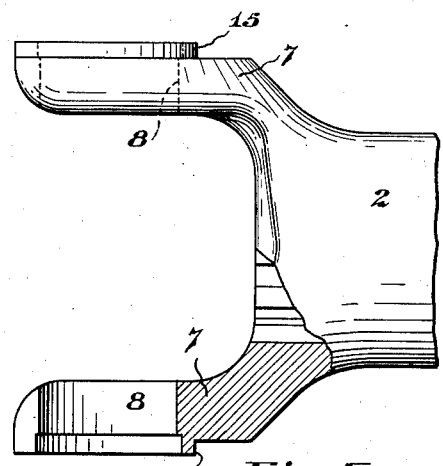
Fig. 5 is a side elevation of one of the universal joint yokes, a portion of the same being broken away and shown in section.
Figure 10:
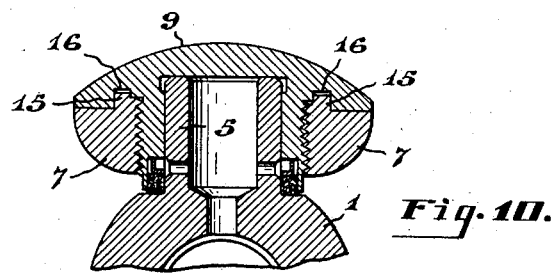
Fig. 10 is a section somewhat similar to Fig. 4 but showing a modified means for securing the retaining cap to the yoke arm.

Each cap 9 is formed with a circumferential flange portion 13 that seats against the outer face of the arm 7 and which is rigidly secured to the arm by means of screws 14, as shown in Figs. 1 and 4, or by suitable bolts. In some instances the sleeve 10 may be externally threaded and arranged to thread into the yoke arms 7, as shown in Fig. 10. It is obvious, however, that other securing means may be employed to perform the same function as the securing means described, that is, to prevent movement of the cap 9 axially of the arms 7.

In the case of the securing means shown in Figs. 1 and 4, it is to be noted that the securing screws 14 extend through the opposite bifurcations of each yoke arm 7 in such a manner as to provide, together with the caps 9, a tying means extending between the arm bifurcations, thus giving added strength to the structure and serving to prevent separation of the arm bifurcations.

In some cases, however, it is very desirable to provide additional means to prevent inadvertent separation or spreading of the bifurcations of the yoke arm. As shown in the drawings, this may consist of an outwardly extending circular flange 15 formed on the outer face of the arm coaxial with and arranged near the arm opening 8, which is received in an annular recess 16 formed in the flange portion 13. If desired, however, the arrangement of the annular flange and recess may be reversed,—that is, the recess may be formed in an arm 7 and the annular flange formed on the cap 9.

Another obvious modification is that a groove may be provided in both the arm and cap, and a loosely mounted ring, or other interlocking means, may be mounted in the grooves. In some cases, it may be desirable to employ a cap having a marginal depending portion that overlaps with the yoke arm to provide the same function—that is, to prevent relative transverse movements between the cap and yoke arm bifurcations.

The present invention contemplates that either arrangement may be used, it being the object to provide an interlocking connection between each cap 9 and the arm 7 which will take care of and absorb the forces of the arm that tend to separate the bifurcations. In many of the conventional constructions heretofore known, no provision has been made for preventing the separation described. It has been found that the cap means for journaling the bearing pins 5 of the cross, together with the interlocking arrangement between the caps and the yoke arms, has materially added to the strength and life of the cross type universal joints.

In some cases the cap 9 may be formed without a bearing sleeve, and may function merely as a tying means for the arm bifurcations, in which case the bearing pin bushings may be carried directly by the yoke arms.

Figure 9:
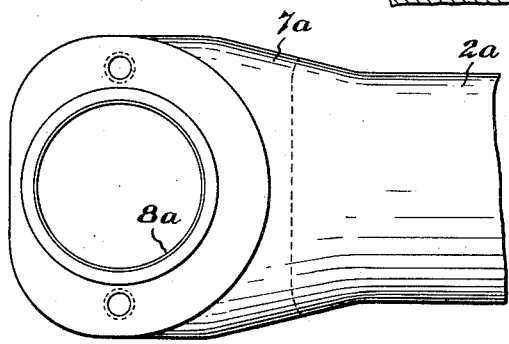
Fig. 9 is a plan view of a universal joint yoke in which the cap receiving opening is continuous.

A modified yoke construction is shown in Fig. 9 wherein each arm of the yoke 2ª is not bifurcated as the arms shown in the other views, but is formed with a continuous circular opening 8ª that corresponds with the openings previously described.

End thrust of the cross in many of the joints heretofore known was taken care of by providing bearing surfaces at the inner faces of the yoke arms. This was very disadvantageous in that an efficient seal could not be maintained for the retention of lubricants without the use of a housing surrounding the joint. In the construction of the present invention, end thrust of each bearing pin is taken by the cap portion and at the outer end of the bearing pin. As shown in Fig. 4, the cap 9 is formed with a bearing surface 17 at the bottom of the central opening therein against which the transverse surface of the outer end of the bearing pin 5 seats. The base of the central opening in each cap 9 may be circumferentially undercut to provide a lubricant pocket 18, as shown in Fig. 4.

Each cap 9 is formed with a counterbore 19 at the open end of the sleeve portion for the reception of a suitable lubricant sealing ring 20 that surrounds the cooperating cross bearing pins 5. It is preferable to provide an annular stamped metal ring 21 of L-shaped cross section between the sealing ring and the bottom of the counterbore 9, the purpose of which is to be later described.

The present invention further contemplates new and improved means for lubricating universal joints, which will now be described. Each bearing pin 5 is formed with a coaxial lubricant opening 22, the bottom of which is formed with a conical seat 23 and communicates through a passageway 24 of reduced size with a lubricant chamber 25 formed in the center of the cross 1. The chamber 25 is closed in at the one side by the metal of the cross, and at the opposite side with a suitable cover portion 26 that is pressed into a depression 27, as shown in Fig. 2. Other retaining means for the cover portion 26 may, however, be employed, if desired.

A filler opening, closed in by a suitable screw plug 28, is provided at the opposite side of the cross, so that suitable lubricant may be placed in the chamber 25, and this plug is preferably arranged at an angle so that access may be had thereto and to the filler opening between the arms 7 of the adjacent yoke 2. If desired, the plug 28 may be replaced by a suitable grease gun fitting of any well known type.

The cover portion 26 is provided with a plug 29 having a recess 30 therein communicating with the chamber 25. This recess is normally closed by a spring-pressed ball valve 31 which provides an overflow or relief valve that permits excess lubricant to be discharged between the arms of the adjacent yoke. The spring 32 is so calibrated as to prevent the expulsion of lubricant around the sealing rings 20,—that is, the ball valve 31 will open under pressure of the lubricant before the pressure can force the lubricant out around the sealing rings 20. This decreases the possibility of the joints throwing lubricant by reason of the rotation thereof.

Figure 3:
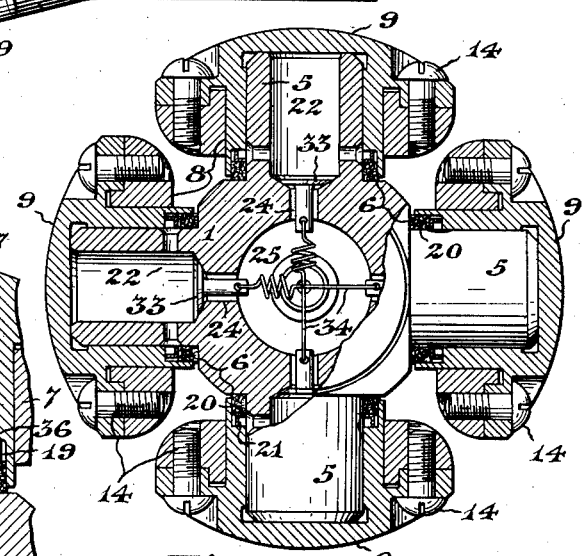
Fig. 3 is an enlarged section taken substantially on the line 3—3 of Fig. 1 showing the joint construction in detail.

Each passageway 24 is arranged to be closed by a valve head 33 that seats on the conical seat 23, and the stem of each valve head is connected by means of a coil spring 34 to the stem of the diametrically opposite valve head, as shown in Figs. 2 and 3. The spring 34 which connects one pair of valve heads 33 crosses the spring 34 that connects the other opposed pair of valve heads.

Other means, however, such as spring-pressed ball members, may be used in place of the valves 33 without departing from the spirit and scope of the present invention.

The primary function of the spring-held valve heads 34 is to prevent the lubricant, in case the amount in the chamber is low, from accumulating in any one or two lubricant passages 22, when the joint is stationary, so that the joint, when rotated, would not expel all of the accumulated lubricant. This therefore provides a lubricant control for the various bearing pins in order to maintain a sufficient amount of lubricant in the chamber 25 for the lubrication of all of the bearing pins 5.

The valve head connecting springs 34 are so calibrated that the valve heads 33 will be moved radially outwardly by centrifugal force when the joint is rotated, to thereby open the lubricant passages 24 and permit the flow of lubricant therethrough. The valve heads also serve to prevent the flow of lubricant from the uppermost pin passages 22 into the chamber 25 when the joint is stationary, thereby always maintaining a supply of lubricant in the passages 22.

Another function that is accomplished by the lubrication means described, is that when the chamber 25 is being filled by lubricant under pressure, the chamber will first be completely filled. Subsequently, the valve heads 33 open the passages 24 by reason of the pressure, and permit the lubricant chambers 22 in the bearing pins 5 to be filled, and a certain amount of the lubricant to be passed between the bearing surfaces of the caps 9 and pins 5. However, before the pressure of the lubricant will force the lubricant out around the sealing rings 20, the spring-pressed valve 31 opens and relieves the pressure within the chamber 25, thus permitting excess lubricant to be discharged through the opening 30.

In operation of the universal joint described, the lubricant is thrown outwardly by centrifugal force, and passes between the ends of the bearing pins 5 and the thrust faces 17 of the retaining caps 9, into the lubricant pocket 18. From here the lubricant works between the bearing faces of the caps 9 and pins 5, and has a tendency to be squeezed toward the open ends of the caps 9.

In order to utilize the lubricant that might otherwise be expelled around the sealing rings, additional means has been provided in the device described to effect a recirculation of the lubricant. Two different methods of accomplishing recirculation of the lubricant are shown in the drawings.

Figure 11:
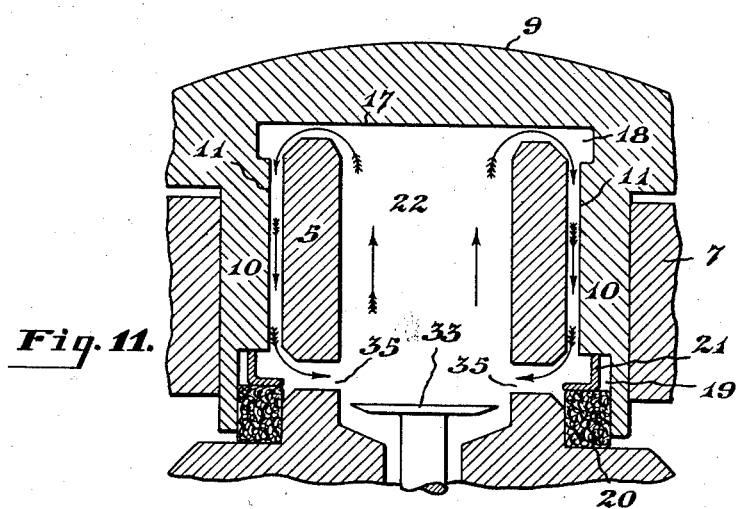
Figs. 11 and 12 are exaggerated views in which the bearing surfaces of the constructions shown in Figs. 4 and 7, respectively, are spaced apart in order to clearly illustrate the re-circulation of lubricant, the arrows shown therein representing the said re-circulation.

In the construction shown in Figs. 3 and 4, a suitable number of transverse apertures 35 are provided to extend through the wall of each cross bearing pin 5. These apertures are arranged near the base of the bearing pin so that the lubricant forced between the bearing faces into the pocket 36, provided by the annular L-shaped stamping 21, may flow through the aperture 35 back into the lubricant passage 22, where it may again be thrown outwardly by centrifugal force to lubricate the bearing faces. This recirculation of lubricant is shown more clearly by the arrows indicated in the exaggerated showing of Fig. 11, where the bearing faces are illustrated as being spaced from each other.

In the construction shown in Fig. 7, a removable bushing 12 is used as a journal for the cross bearing pin 5. In this construction a suitable annular metal washer 26 is positioned between the sealing ring 20 and the bottom of the cap counterbore, and the bushing 12 seats against the washer 36. The transverse end faces of the bushing 12 are both provided with a plurality of radial notches 37 that provide passageways between the inner ends of the bushing and the washer, and between the outer end of the bushing and thrust bearing face 17 of the cap 9.

Figure 12:
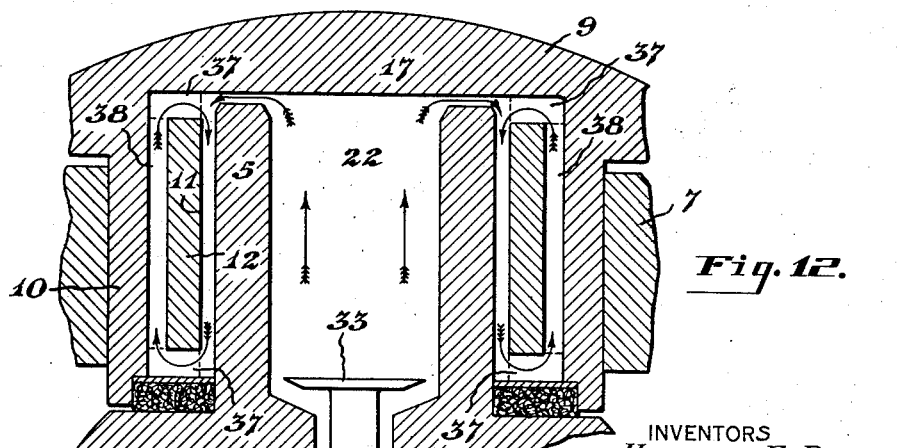

Suitable apertures extending through the bushing 12, adjacent the ends thereof, may be used in place of the notches to provide the same effect as the notches. The outer circumferential face of the bushing 12 is also formed with a plurality of longitudinal depressions 38 that extend between the notches 37 at the opposite ends of the bushing, thus providing passages between the circumferential inner wall of the cap sleeve 10 and the bushing for the circulation of lubricant. These depressions, however, may be formed in the wall of the cap 9. The lubricant as it is forced outwardly between the bearing faces by centrifugal force, passes through the inner notches 37 into the longitudinal depressions 38, where it is again thrown outwardly by centrifugal force. The recirculated lubricant then passes through the outer notches to the bearing faces, where it may again lubricate these faces. This recirculation effect is more clearly shown by the arrows indicated in the exaggerated showing of Fig. 12, where the bearing faces are illustrated as spaced from each other.

There are many inherent advantages in universal joint construction shown in the drawings which are clearly apparent from the foregoing description.

It has been found that the lubricant control and lubricant recirculation means described greatly adds to the life of and greatly increases the efficiency of universal joints because of the proper distribution of lubricant through the various bearing faces.

The cap means of mounting the universal joint cross in the joint yokes increases the strength of the joint by reason of the fact that a tying means is provided across the bifurcations of the yoke arms. The cap means furthermore permits rapid and easy assembly of the joints, it being necessary only to position the opposed bearing pins within the openings in telescoping relation with the cross bearing pins, and lastly thread the retaining screws into the arms of the yokes.

It is to be particularly noted that the universal joint described is of very rugged nature, but is simple in construction.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In a universal joint, a body having a lubricant-holding chamber therein, bearing pins radiating from said body, lubricant passage-ways in said bearing pins in communication with said chamber, a universal joint yoke having a pair of spaced arms, bushings mounted in said arms and having bearing engagement with said bearing pins, means for conducting the lubricant moved outwardly by centrifugal force through said passage-ways to the outer ends of the cooperating bearing faces of said bushings and pins, and means for conducting substantially all the unused lubricant passed between said pins and bushings back to the outer ends thereof.

2. In a universal joint, a body having a lubricant-holding chamber therein, bearing pins radiating from said body, lubricant passage-ways in said bearing pins in communication with said chamber, a universal joint yoke having a pair of spaced arms, bushings mounted in said arms and having bearing engagement with said bearing pins, and means for conducting the lubricant moved outwardly by centrifugal force through said passageways to the outer ends of the cooperating bearing faces of said bushings and pins, said bearing pins having transverse openings through their walls inwardly of said outer ends and adjacent to said body for conducting the lubricant passed between said pins and bushings back to said passage-ways.

3. In a universal joint, a body having a lubricant-holding chamber therein, bearing pins radiating from said body, lubricant passageways in said bearing pins in communication with said chamber, a universal joint yoke having a pair of spaced arms, sleeves fitted within and secured to said arms, bushings within said sleeves and having bearing engagement with said pins, annular sealing rings surrounding said bearing pins and disposed between said bushings and said body, means for conducting the lubricant, moved outwardly by centrifugal force through said pin passageways, to the outer ends of the cooperating bearing faces of said bushings and pins, and means for conducting the lubricant passed between said pins and bushings back to said outer ends.

4. In a universal joint, a body having a lubricant-holding chamber therein, bearing pins radiating from said body, lubricant passageways in said bearing pins in communication with said chamber, a universal joint yoke having a pair of spaced arms, sleeves fitted within and secured to said arms, bushings within said sleeves and having bearing engagement with said pins, annular sealing rings surrounding said bearing pins and disposed between said bushings and said body, means for conducting the lubricant, moved outwardly by centrifugal force through said pin passageways, to the outer ends of the cooperating bearing faces of said bushings and pins, and means for conducting the lubricant passed between said pins and bushings back to said outer ends, said means including passages at the inner ends of said bushings extending through the walls thereof and lubricant-conducting passages between the walls of said sleeves and outer faces of said bushings and communicating with said bushing passages.

5. In a universal joint, a body having a lubricant-holding chamber therein, bearing pins radiating from said body, lubricant passageways in said bearing pins in communication with said chamber, a universal joint yoke having a pair of spaced arms, sleeves fitted within and secured to said arms, bushings within said sleeves and having bearing engagement with said pins, annular sealing rings surrounding said bearing pins and disposed between said bushings and said body, means for conducting the lubricant, moved outwardly by centrifugal force through said pin passageways, to the outer ends of the cooperating bearing faces of said bushings and pins, and means for conducting the lubricant passed between said pins and bushings back to said outer ends, said means including recesses in the inner ends of said bushings, the bottoms thereof being spaced from said sealing rings, and lubricant conducting passages between the walls of said sleeves and outer faces of said bushings and communicating with said recesses.

6. In a universal joint, a body having a lubricant-holding chamber therein, bearing pins radiating from said body, lubricant passageways in said bearing pins in communication with said chamber, a universal joint yoke having a pair of spaced arms, sleeves fitted within and secured to said arms, said sleeves having closed outer ends in bearing engagement with the outer ends of said pins, bushings within said sleeves and having bearing engagement with said pins, annular sealing rings surrounding said pins and disposed between said bushings and said body, means for conducting the lubricant, moved outwardly by centrifugal force through said pin passageways, to the outer ends of the cooperating bearing faces of said bushings and pins, and means for conducting the lubricant passed between said pins and bushings back to said outer ends, said means including recesses in the inner and outer ends of said bushings spaced from said sealing rings and transverse sleeve ends respectively, and longitudinal passages between the walls of said sleeves and pin bearing faces communicating at their outer ends with said bushing recesses.

WILLIAM W. SLAGHT.
HERMAN F. BRAUN.